United States Patent [19]

Kato et al.

[11] Patent Number: 5,198,299
[45] Date of Patent: Mar. 30, 1993

[54] RELEASE SHEET

[75] Inventors: Takahisa Kato; Seigo Ebato, both of Tokyo, Japan

[73] Assignee: Mitsubishi Paper Mills Limited, Japan

[21] Appl. No.: 733,611

[22] Filed: Jul. 22, 1991

[30] Foreign Application Priority Data

Jul. 27, 1990 [JP] Japan .................................. 2-200843

[51] Int. Cl.$^5$ ................................................. B32B 7/06
[52] U.S. Cl. ..................................... 428/340; 428/352; 428/447; 428/452
[58] Field of Search ...................... 428/40, 41, 42, 340, 428/352, 447, 452, 510, 514, 520, 522

[56] References Cited

U.S. PATENT DOCUMENTS

| | | | |
|---|---|---|---|
| 3,903,322 | 9/1975 | Ravve et al. | 427/54 |
| 4,201,808 | 5/1980 | Cully et al. | 428/40 |
| 5,061,535 | 10/1991 | Kreckel et al. | 428/42 |

Primary Examiner—Paul J. Thibodeau
Assistant Examiner—D. S. Nakarani
Attorney, Agent, or Firm—Finnegan, Henderson, Farabow, Garrett & Dunner

[57] ABSTRACT

A release sheet comprises a support and a layer composed of a dispersion containing dipentaerythritol penta- or hexaacrylate and an electron beam curable silicone resin and the layer is cured by irradiation with electron beam.

6 Claims, No Drawings

RELEASE SHEET

BACKGROUND OF THE INVENTION

1. Field of the invention

The present invention relates to a release sheet, and more particularly, to a release sheet comprising a support and a release layer provided thereon of which release characteristics are controlled and which bonds fast to the support.

2. Description of the Related Art

A release sheet is composed of a sheet-like support such as aqueous coated paper, laminated paper, synthetic paper, non-woven cloth, plastic film, metal foil and the like and a release layer provided on the sheet-like support. A release sheet is used as a release sheet for adhesive products such as pressure sensitive adhesive tapes, labels and the like; it is also used in manufacturing synthetic leather, prepreg, flooring material, various molded articles and the like.

Recently, a low temperature curing type technique has been developed to manufacture a release sheet, wherein a non-solvent type silicone resin, in particular, one having functional groups polymerizable by irradiation with ultraviolet ray or electron beam, is applied on a support, and then cured by being subjected to ultraviolet ray or electron beam.

This technique was relatively successful in eliminating certain quality defects like curling, wrinkles and pinholes of a release sheet attributable to a high heat processing of a conventional technique making use of a heat curing silicone resin.

However, this low temperature curing type technique was not free of problems. Use of said non-solvent type silicone resin necessitated application of an aqueous coating layer or a polyethylene primer layer on a support in order to block permeation of said non-solvent type silicone resin into the support, and such an aqueous coating layer or polyethylene primer layer in turn tends to weaken bond between the support and release layer; bonding within a release layer tends to be weak, resulting in an inner exfoliation (so-called "rub-off"); moreover, the silicone resin transfers to a tacky layer when it is laid on the release layer.

In order to solve the above-mentioned problems, there is proposed a method in which a polyacrylate ester having two, three or 4 functional groups is added to an electron beam curing silicone resin (Japanese Patent Publication No. 57096/1982). However, according to this method, when the resin dispersion is allowed to stand, it becomes separated into different phases and therefore, it has to be dispersed again right before coating. If such redispersion is omitted, the expected release characteristic can not be obtained and moreover, more dose of electron beam irradiation is required for curing.

Further, there are proposed a method of increasing the concentration of acryl or methacryl group to be introduced into an electron beam curable silicone resin so as to enhance bond between the support and the release layer and to inhibit transfer of the silicone resin to the adhesive layer when it is laid (Japanese Patent Publication No. 233162/1985), and a method of providing as an anchor layer an ultraviolet light or electron beam curable resin bonding fast to a support between an electron beam curable silicone resin layer and a support (Japanese Patent Application Laid-Open No. 80525/1989).

Even if such methods are employed, the bond between the silicone resin layer and the anchor layer is still insufficient, rub-off of the silicone resin layer still occurs, and moreover this silicone resin still transfers to a tacky layer when it is laid on the silicone layer. Moreover, in the case of a release sheet used as a processing paper for producing a synthetic leather, a prepreg and the like, there is a problem that a commercially available electron beam curable silicone resin exhibits only too poor release property.

SUMMARY OF THE INVENTION

An object of the present invention is to provide a release sheet having an excellent bond between a release layer and support.

Another object of the present invention is to provide a release sheet in which a silicone resin does not transfer to a tacky layer when it is laid on a release layer.

A further object of the present invention is to provide a release sheet the release property of which can be controlled.

Still another object of the present invention is to provide a release sheet which can be produced by using an electron beam curable silicone resin dispersion having a good dispersion stability.

A still further object of the present invention is to provide a release sheet a release layer of which is free from rub-off.

According to one aspect of the present invention, there is provided a release sheet comprising a support and a release layer provided on at least a side thereof, layer composition of which comprises a dispersion of a compound of the general formula,

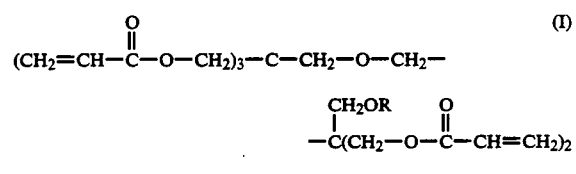

where R is hydrogen or —COCH=CH$_2$, and an electron beam curable silicone resin; the dispersion being cured by irradiation with electron beam.

According to another aspect of the present invention, there is provided a release sheet which comprises a support and layers provided thereon in the order of a subbing layer containing an electron beam curable resin and a release layer comprising a compound of formula [I] above and an electron beam curable silicone resin; the layers being cured by electron beam irradiation.

DESCRIPTION OF THE PREFERRED EMBODIMENT

According to the present invention, the electron beam curable resin dispersion comprises a compound of the formula (I) above, that is, dipentaerythritol pentaacrylate or dipentaerythritol hexaacrylate and an electron beam curable silicone resin. This dispersion exhibits high dispersion stability, which can be maintained for more than 24 hours.

The release sheet of the present invention may be produced as follows. The above-mentioned dispersion is applied on a support and the dispersion thus applied is subjected to electron beam irradiation.

Since dipentaerythritol pentaacrylate and dipentaerythritol hexaacrylate have high reactivity with electron beam and high crosslinking property, the release sheet thus produced shows fast bond between the support and the release layer and is free from rub-off, and when a tacky layer is laid on the release layer, the silicone resin does not transfer to the tacky layer.

In addition, when the electron beam curable silicone resin and dipentaerythritol pentaacrylate and/or dipentaerythritol hexaacrylate are mixed and dispersed in an emulsified state, a sea-and-island structure composed of the electron beam curable silicone resin and dipentaerythritol pentaacrylate and/or dipentaerythritol hexaacrylate is formed at the surface of release layer, and therefore, the release strength can be easily controlled by the mixing ratio of these components.

As a result, it is possible to obtain a desired release force required for processing papers used in the manufacture of synthetic leather, prepreg or the like.

As an electron beam curable silicone resin, there may be used a polysiloxane having functional groups selected from acryloyl, methacryloyl, vinyl, epoxy and the like at its ends of the molecule or at its side chain.

Examples of such resin are compounds disclosed in Japanese Patent Publication Nos. 42961/1976, 6512/1979, and 53656/1983.

The ratio of dipentaerythritol pentaacrylate and/or dipentaerythritol hexaacrylate to the electron beam curable silicone resin may be appropriately varied depending on the desired release property.

A preferable ratio is within such range that dipentaerythritol pentaacrylate and/or dipentaerythritol hexaacrylate can be dispersed in the electron beam curable silicone resin. More particularly, the amount of said silicone resin is preferably in the range of 30-90 % by weight of the dispersion.

Amount of the dispersion comprising dipentaerythritol pentaacrylate and/or dipentaerythritol hexaacrylate and the electron beam curable silicone resin to be applied on a support varies depending on type of the support and on whether or not it has a subbing layer.

The amount of the dispersion to be applied is usually 0.1-20 g/m$^2$, preferably 0.5-10 g/m$^2$.

When the amount of the dispersion is less than 0.1 g/m$^2$, it is difficult to apply the dispersion uniformly to the support such as paper and the like, and release property of the layer becomes poor.

When the amount of the dispersion is higher than 20 g/m$^2$, the characteristics of the release sheet are not improved any more while the cost becomes high and therefore, it is not economical.

For further improving stability of dispersion composition comprising dipentaerythritol pentaacrylate and/or dipentaerythritol hexaacrylate and the electron beam curable silicone resin, a surfactant or the like may be added as a dispersion aid.

As the support used in the present invention, there may be used various papers such as glassine, woodfree paper, board, coated papers having aqueous coating layers, and the like, synthetic resin films such as polyethylene, polypropylene, polyethylene terephthalate, polyamide and the like, laminated papers comprising a paper support and such synthetic resin laminated on one or both sides thereof, non-woven cloth, metal foil, metal foil laminated with paper or synthetic resin film and the like.

Any kind of support generally used for release sheets may be used for the present invention.

The surface of the support may be subjected to a surface treatment such as corna discharging before it is applied with the release layer composition so as to improve bond between the release layer and the support.

Basis weight of the support may vary depending on its kind. In the case of paper, for example, it is 40-250 g/m$^2$, preferably 50-200 g/m$^2$; a paper having smooth surface is preferred, but one having a certain surface roughness may be used in view of controlling release property of the release sheet.

In order to reduce the amount of the silicone resin in the release layer or improve the surface smoothness, subbing layer comprising an electron beam curable resin bonding with the support well may be applied on the support and if necessary, a part of the subbing layer is polymerized and a release layer is applied on the subbing layer, and finally curing may be effected by irradiation with electron beam.

Before applying a subbing layer on the support, its surface may be subjected to a surface treatment such as corona discharging and the like.

As an electron beam curable resin for the subbing layer, any compound usually used in this technical field may be used which has unsaturated bonds and is curable by electron beam irradiation.

As a method for applying a release layer and subbing resin on a support, there may be employed, for example, blade coating, squeeze coating, air-knife coating, reverse roll coating, gravure roll coating, transfer roll coating and the like.

The resin composition for forming the release layer of the present invention may be applied directly or may be applied in the form of a mixture with an appropriate solvent.

As an electron beam accelerator, there may be used electrocurtain system, scanning type, double scanning type or the like. The curtain type is preferable since one giving a greater power electron beam is obtained at relatively low cost.

From the standpoints of penetrating power and curing power, it is preferable that specification of the electron beam fulfills the following conditions: acceleration voltage of an electron beam accelerator be 50-750 kV, more preferably 100-300 kV; onepass absorption be made 0.5-20 Mrad.

When the acceleration voltage is lower than 50 kV, the transmission amount of energy is insufficient, and when the acceleration voltage is higher than 750 kV, the energy efficiency is lowered and not economical.

When the absorption dose is less than 0.5 Mrad, the curing reaction does not proceed sufficiently so that a release layer having sufficient handness is not obtained. When the absorption dose exceeds 20 Mrad, the energy efficiency goes down, and further detrimental effects may result; deformation of a release layer film and decomposition of resin in the film being irradiated due to heat generated by such excessive dose; deterioration of a paper support proceeds remarkably.

The curing caused by irradiation of electron beam is a radical reaction and is influenced by oxygen concentration in the atmosphere, and therefore, the irradiation is preferably effected in an atmosphere where the oxygen concentration is controlled to 600 ppm or less, preferably 400 ppm or less by replacing air with inert gases such as nitrogen, helium, carbon dioxide and the like.

According to the present invention, the electron beam curable resin dispersion comprising dipentaerythritol pentaacrylate and/or dipentaerythritol hexaacrylate and the electron beam curable silicone resin shows a good dispersion stability and therefore, the dispersion state can be maintained for 24 hours or more.

According to the present invention, a release sheet is formed by providing on at least a side of a support a release layer comprising an electron beam curable silicone resin dispersion containing dipentaerythritol pentaacrylate and/or diepentaerythritol hexaacrylate, and curing the layer by electron beam irradiation. Since dipentaerythritol pentaacrylate and/or diepentaerythritol hexaacrylate exhibits a high reactivity and crosslinking ability, a fast bond between the support and the release layer is achieved, rub-off in the release layer is eliminated, and transfer of the silicone resin to a tacky layer when it is laid on the release layer is blocked. Further, release characteristics of the release layer can be controlled by adjusting the mixing ratio of dipentaerythritol pentaacrylate and/or diepentaerythritol hexaacrylate to the electron beam curable silicone resin dispersion. The present invention is now more particularly described with reference to the following examples and comparative examples which are for the purpose of illustration only and are intended to imply no limitation thereon.

Parts are by weight in the examples and comparative examples.

EXAMPLE 1

To one surface of a natural pulp paper of basis weight of 142 g/m² as a support was applied an aqueous coating composition as shown below in an amount of 10 g/m² as dry solid, dried and subjected to a calender treatment to produce a raw stock of release sheet. An electron beam curable resin dispersion to be formed into a release layer was prepared by dispersing the composition as shown below with a homogenizing mixer and used for coating.

The resulting electron beam curable resin dispersion was applied to the surface of the aqueous coating composition layer of the raw stock of release sheet in a coating weight of 5 g/m² by means of a gravure offset coater and introduced into an electron beam irradiation apparatus (Curetron, tradename, manufactured by NISSIN HIGH VOLTAGE CO. LTD.) in which the concentration of oxygen in an electron beam irradiation chamber is reduced to 200 ppm or less by replacing with nitrogen gas, and irradiated with electron beam from the coated surface side at an electron beam accelerating voltage of 175 kV and an absorption dose of 3 Mrad to produce a release sheet.

| Aqueous coating composition: | |
|---|---|
| Kaolin (Alphacoat, tradename, manufactured by Angloamerican Clay Co. Ltd.) | 42 parts |
| Oxidized starch (MS - 3600, tradename, manufactured by Nihon Shokuhin K.K.) | 1 part |
| Latex (L - 1109, tradename, manufactured by Asahi Kasei K.K.) | 7 parts |
| Water | 50 parts |
| Electron beam curable resin dispersion: | |
| Electron beam curable silicone resin (X - 62 - 7200, tradename, manufactured by Shinetsu Kagaku Kogyo K.K.) | 50 parts |
| Dipentaerythritol hexaacrylate (Aronix M - 400, tradename, manufactured by Toa Gosei Kagaku K.K.) | 50 parts |

EXAMPLE 2

The procedure of Example 1 was repeated except that the electron beam curable resin dispersion to be formed into a release layer was replaced by the following composition, and a release sheet was obtained,.

| Electron beam curable silicone resin (X - 62 - 7200, tradename, manufactured by Shinetsu Kagaku Kogyo K.K.) | 70 parts |
|---|---|
| Dipentaerythritol hexaacrylate (Aronix M - 400, tradename, manufactured by Toa Gosei Kagaku K.K.) | 30 parts |

EXAMPLE 3

The procedure of Example 1 was repeated except that the electron beam curable resin dispersion to be formed into a release layer was replaced by that having the following composition, and a release sheet was obtained.

| Electron beam curable silicone resin (X - 62 - 7200, tradename, manufactured by Shinetsu Kagaku Kogyo K.K.) | 80 parts |
|---|---|
| Dipentaerythritol hexaacrylate (aronix M - 400, tradename, manufactured by Toa Gosei Kagaku K.K.) | 20 parts |

EXAMPLE 4

To the surface of the aqueous coating composition layer of the raw stock of release sheet in Example 1 was applied on electron beam curable resin dispersion of the following composition to form a subbing layer in a coating weight of 4 g/m² as dry solid by means of a gravure offset coater, and the resulting product was introduced into the electron beam irradiation apparatus where the concentration of oxygen in an electron beam irradiation chamber is reduced to 200 ppm or less by replacing with nitrogen gas, and irradiated with electron beam from the coated surface side at an electron beam accelerating voltage of 175 kV and an absorption dose of 0.2 Mrad.

Then, the same electron beam curable resin dispersion to be formed into a release layer as that used in Example 1 was applied to the surface of the resulting subbing layer in a coating weight of 1 g/m² as dry solid followed by repeating the procedure of Example 1 to produce a release sheet.

| Electron beam curable resin, Aronix M - 7100 (tradename, manufactured by Toa Gosei Kagaku K.K.) | 60 parts |
|---|---|
| Electron beam curable resin, Aronix M - 309 (tradename, manufactured by Toa gosei Kagaku K.K ) | 40 parts |

COMPARISON EXAMPLE 1

The procedure of Example 1 was repeated except that the electron beam curable resin dispersion to be formed into a release layer was replaced with the Electron beam curable silicone resin X - 62-7200, and a release sheet was prepared.

COMPARISON EXAMPLE 2

The procedure of Example 1 was repeated except that the electron beam curable resin dispersion to be formed into a release layer was replaced with the Electron beam curable non-silicone resin Aronix M - 400 and a release sheet was prepared.

COMPARISON EXAMPLE 3

The procedure of Example 1 was repeated except that dipentaerythritol hexaacrylate (Aronix M - 400 manufactured by Toa Gosei Kagaku K.K.) was replaced with trimethylolpropane triacrylate (Aronix M - 309, manufactured by Toa Gosei Kagaku K.K.), and a release sheet was prepared.

COMPARISON EXAMPLE 4

The procedure of Example 3 was repeated except that dipentaerythritol hexaacrylate (Aronix M - 400 manufactured by Toa Gosei Kagaku K.K.) was replaced wtih trimethylolpropane triacrylate (Aronix M - 309, manufactured by Toa Gosei Kagaku K.K.), and a release sheet was prepared.

COMPARISON EXAMPLE 5

The procedure of Example 4 was repeated except that the electron beam curable resin dispersion to become a release layer was replaced with the Electron beam curable silicone resin X - 62-7200, and a release sheet was prepared.

EVALUATION

Dispersibility

An electron beam curable resin dispersion was dispersed by stirring for 10 minutes with a homogenizing mixer and allowed to stand for 24 hours.

A dispersion which was not separated into two phases was shown by a sign "O" which means good dispersibility while a dispersion which was separated into two phases was shown by a sign "X" which means poor disperisibility. The result is shown in Table 1.

Release Characteristics

On a release layer of each of samples obtained in Examples 1-4 and Comparison Examples 1-5 was laid a tacky urethane resin layer by applying thereto a urethane resin composition, drying and curing it at 150° C. for 30 minutes. The preparation was cut into a piece having a width of 25 cm.

The resulting piece was subjected to the measurement of release between the urethane resin layer and the release sheet by means of a Tensilon universal tester (CR 7000, tradename, manufactured by TOYO BOLDWIN CO. LTD.)

The result is shown in Table 1.

With respect to Comparison Example 2, the urethane resin layer was adhered to the release sheet and when the release was effected, an inner layer exfoliation occurred in the raw stock layer. Therefore, the release could not be measured.

Fastness of Bond

The release layer of each of samples obtained in Examples 1-4 and Comparison Examples 1-5 was rubbed with a finger 20 times and an oilphilic ink was thinly applied to the rubbed portion. When the ink was completely repelled, the sample was designated as a sign "O" which means fast bond between the release layer and the support; when there were both a portion where the ink was repelled and a portion which was dyed with the ink, the sample designated as a sign "Δ" which means somewhat poor bond; and when the whole rubbed portion was dyed with the ink without any portion repelling the ink, the sample was designated as a sign "X" which means poor bond.

The result is shown in Table 1.

With respect to Comparison Example 2, an electron beam curable silicone resin was not used and therefore, this evaluation was not effected.

Transferability

Transferability of silicone resin to a tacky layer for each of samples of Examples 1-4 and Comparison Examples 1-5 was measured by using the samples used for the release test above. That is, the amount of silicon present on the surface of the urethane resin layer which had been in contact with the release layer was measured by means of a fully automatic fluorescent X-ray analysis apparatus (SYSTEM 3270E, tradename, manufactured by Rigaku Denki Kogyo K.K.).

When no silicon was detected at all, the sample was designated as a sign "O" which means to be desirable since no transfer of silicon occurred. When silicon was detected, the sample was designated as a sign "X" which means to be undesirable since silicon was transferred to outside from the release layer.

The result is shown in Table 1.

With respect to Comparison Example 2, when the urethane resin layer was laid on the release sheet and then released therefrom, inner layer exfoliation occurred in the sample raw stock layer and therefore the evaluation of transferability could not be effected.

TABLE 1

| | Characteristics of Release Sheet | | | | |
| --- | --- | --- | --- | --- | --- |
| | Dispersibility | Release (gram-force/25 mm) | | Fastness of bond | Transferability |
| | | Maximum Load | Average Load | | |
| Example 1 | O | 46 | 31 | O | O |
| Example 2 | O | 38 | 24 | O | O |
| Example 3 | O | 31 | 19 | O | O |
| Example 4 | O | 45 | 30 | O | O |
| Comparative Example 1 | — | 22 | 10 | X | X |
| Comparative Example 2 | — | Not measurable | Not measurable | — | — |
| Comparative Example 3 | X | 36 | 23 | O | O |
| Comparative Example 4 | X | 25 | 21 | Δ | X |
| Comparative Example 5 | O | 17 | 10 | Δ | X |

As are clear from Table 1, the electron beam curable resin dispersions prepared in Examples 1, 2, 3 and 4 and Comparison Example 5 are better in the dispersion stability than those in Comparison Examples 3 and 4.

In addition, the release sheets obtained in Examples 1, 2, 3 and 4 and Comparison Example 3 exhibit better bond between the release layer and the support and less transfer of silicone resin to the tacky urethane resin layer than those in Comparison Examples 1, 4 and 5.

The results of Examples 1, 2 and 3, and Comparison Examples 1 and 2 show that the release characteristics can be controlled by adjusting the ratio of an electron beam curable silicone resin to the electron beam curable nonsilicone component.

Further, Examples 1 and 4 show that the amount of an electron beam curable silicone resin can be reduced by providing a subbing layer.

What is claimed is:

1. A release sheet which comprises a support and a layer provided on at least a side thereof comprising a dispersion comprising a compound of the general formula

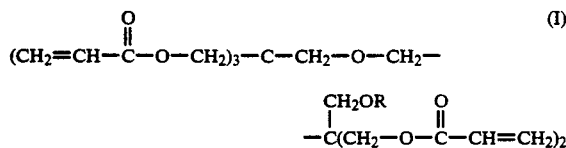

where R is hydrogen or $-COCH=CH_2$,
and an electron beam curable silicone resin, the layer being cured by irradiation with electron beam.

2. A release sheet according to claim 1 in which a subbing layer containing an electron beam curable resin is provided between the support and the layer comprising the dispersion.

3. A release sheet according to claim 1 or 2 in which the content of the electron beam curable silicone resin in the dispersion is 30–90 % by weight.

4. A release sheet according to claim 1 or 2 in which the coating weight as dry solid of the dispersion is 0.1–20 g/m².

5. A release sheet according to claim 2 in which the surface of the support is subjected to corona discharging before applying the subbing layer thereon.

6. A release sheet according o claim 3 in which the coating weight as dry solid of he dispersion is 0.1–20g/m².

* * * * *

UNITED STATES PATENT AND TRADEMARK OFFICE
CERTIFICATE OF CORRECTION

PATENT NO. : 5,198,299

DATED : March 30, 1993

INVENTOR(S) : Takahisa Kato and Seigo Ebato

It is certified that error appears in the above-identified patent and that said Letters Patent is hereby corrected as shown below:

Claim 6, column 10, line 12, "o" should read --to--; and column 10, line 13, "he" should read --the--.

Signed and Sealed this

Twenty-eighth Day of December, 1993

*Attest:*

BRUCE LEHMAN

*Attesting Officer*      Commissioner of Patents and Trademarks